July 22, 1958     J. F. PRIBONIC     2,844,386
RIDE HEIGHT CONTROL VALVE

Filed Jan. 18, 1957     3 Sheets-Sheet 2

INVENTOR.
JOHN F. PRIBONIC
BY
D. C. Staley
HIS ATTORNEY

July 22, 1958 J. F. PRIBONIC 2,844,386
RIDE HEIGHT CONTROL VALVE

Filed Jan. 18, 1957 3 Sheets-Sheet 3

INVENTOR.
JOHN F. PRIBONIC
BY
D. C. Staley
HIS ATTORNEY

United States Patent Office 2,844,386
Patented July 22, 1958

2,844,386

RIDE HEIGHT CONTROL VALVE

John F. Pribonic, Dayton, Ohio, assignor to General Motors Corporation, Detroit, Mich., a corporation of Delaware Application January 18, 1957, Serial No. 634,929

4 Claims. (Cl. 280—124)

This invention relates to a fluid suspension system for vehicles and to controls for regulating the clearance height between the sprung mass and the unsprung mass of the vehicle.

In fluid suspension systems of the prior art it has been conventional to provide controls adapted to maintain a predetermined clearance height between the sprung mass and the unsprung mass of a vehicle so that the clearance height will remain the same irrespective of load conditions in the vehicle. However, under the present trends of lowering clearance height between the sprung mass and the unsprung mass of a vehicle, there are times when the clearance height is insufficient to permit the vehicle to be driven onto a ramp that was built many years ago and was constructed to the dimensions of the old motor vehicles. Also, when vehicles having a relatively low clearance height operates on a heavily rutted road, the clearance height is sometimes insufficient to permit the vehicle to clear the road in a satisfactory manner.

It is therefore an object of this invention to provide a suspension system utilizing a fluid spring that is arranged to provide for a normal low level clearance height between the sprung mass and the unsprung mass of the vehicle under all normal riding and traveling conditions, but to provide for a rising of the clearance height between the sprung mass and the unsprung mass under control of the operator of the vehicle in the event the normal riding clearance height is insufficient to clear any obstruction beneath the vehicle.

It is also an object of the invention to provide controls for supplying fluid to an exhausting fluid from the fluid spring of the suspension system whereby a normal relatively constant clearance height can be maintained between the sprung mass and the unsprung mass of the vehicle, the controls providing for a supply of fluid to the fluid spring to increase the clearance height between the sprung mass and the unsprung mass at the will of the operator of the vehicle.

In accomplishing the foregoing objects it is another object of the invention to provide a control device adapted to regulate the supply of fluid to a fluid spring and exhaust of fluid from a fluid spring in a manner that a normal clearance height is maintained between the sprung mass and the unsprung mass of the vehicle, the control being responsive to the changes in clearance height between the sprung mass and the unsprung mass whereby any corrections will be made by the control device to maintain the predetermined clearance height irrespective of load conditions in the vehicle. The control device is also provided with a bypass valve arrangement whereby fluid can be supplied to the fluid spring through the normal exhaust passage in the control device and thereby bypass the control to provide for increasing the clearance height between the sprung mass and the unsprung mass of the vehicle. In accomplishing this operation an additional control is provided that is under control of the operator of the vehicle for connecting the normal exhaust line of the suspension system with the high pressure fluid source so that for a temporary period as desired by the operator of the vehicle high pressure fluid can be supplied to the fluid spring through the normal control valve by way of the exhaust line connected with the control valve to raise the clearance height to an above normal condition.

Further objects and advantages of the present invention will be apparent from the following description, reference being had to the accompanying drawings wherein a preferred form of the invention is clearly shown.

In the drawings:

Figure 6 is a cross sectional view of a unidirectional bypass valve provided for bypassing the exhaust valve of the control of Figure 2.

Figure 9 is a schematic representation of an electrical control for the auxiliary operated control valve that bypasses the main control valve of the fluid suspension system.

Figure 1:
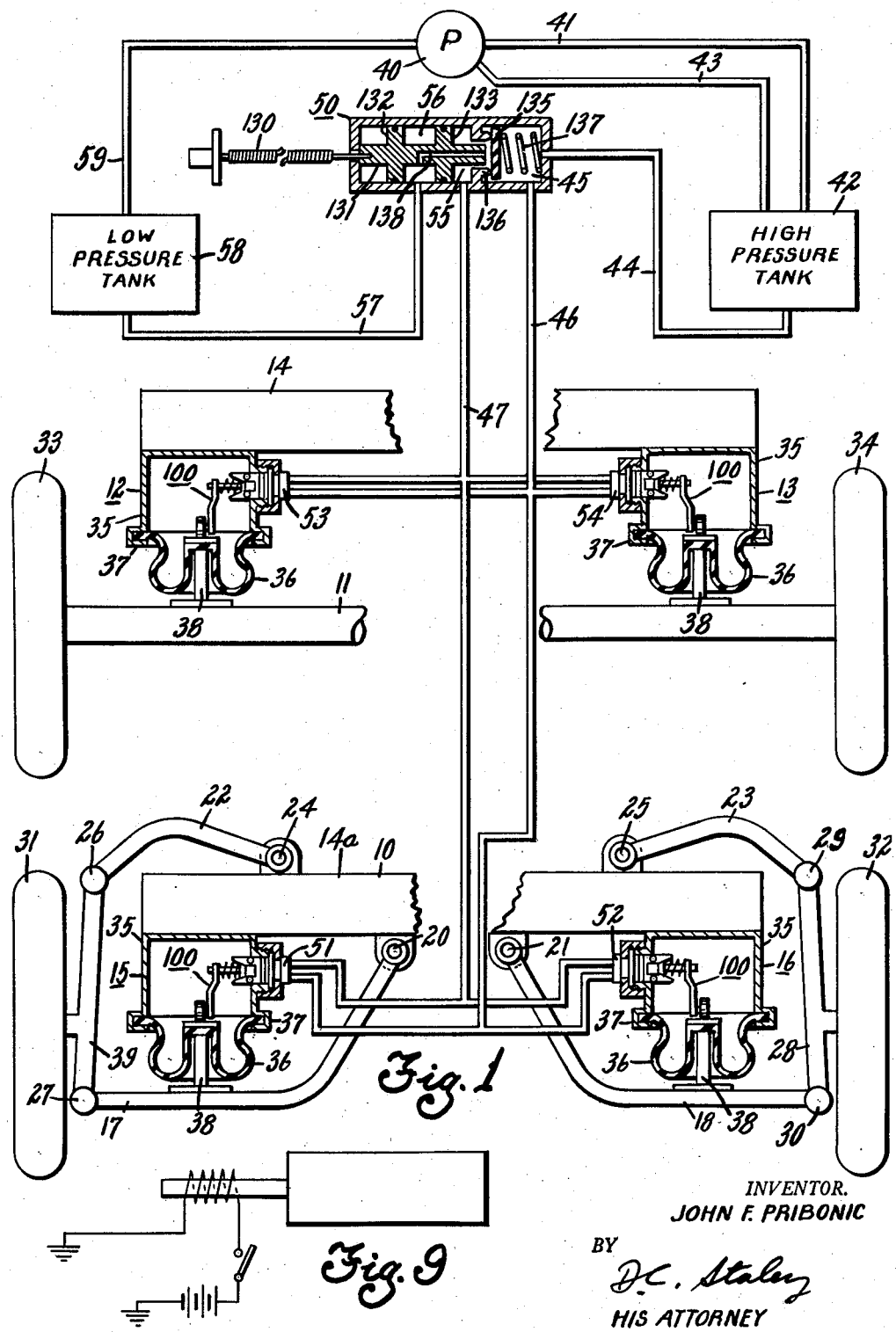
Figure 1 is a diagrammatic representation of a fluid suspension system incorporating features of this invention and controls for accomplishing the result of the invention.

In this invention there is illustrated diagrammatically in Figure 1 a fluid suspension system for a motor vehicle wherein the vehicle consists of a front axle 10 and a rear axle 11. Fluid suspension units 12 and 13 are located between the rear axle 11 and the chassis 14, the rear axle 11 being an unsprung mass while the chassis 14 is the sprung mass of the vehicle. Similarly, fluid suspension units 15 and 16 are located between the lower control arms 17 and 18 and the chassis 14a.

The front end suspension system comprises the lower control arms 17 and 18 pivotally carried on the chassis 14a by the pivot connections 20 and 21. Upper control arms 22 and 23 are pivotally supported on the chassis 14a by the pivot connections 24 and 25. The control arms 17 and 22 are pivotally connected with the steering knuckle 39 by the pivot connections 26 and 27 while the control arms 18 and 23 connect with a similar steering knuckle 28 by the pivot connections 29 and 30. The wheel 31 is carried on the steering knuckle 39 and wheel 32 is carried on the steering knuckle 28. The rear axle 11 supports the wheels 33 and 34.

Each of the fluid springs 12, 13, 15 and 16 consist of a metal container 35 having a flexible diaphragm or bellows 36 secured in the open end 37 of the container 35. The container 35 is secured directly to the chassis 14 whereas the flexible bellows or diaphragm 36 supports the axle 11 or the lower controls arms 17 and 18 of the front suspension by way of a support member 38. The flexible diaphragm 36 or bellows allows for movement of the rear axle 11 relative to the chassis 14 and also allows movement of the lower control arms 17 and 18 relative to the chassis frame 14a, thus providing for a resilient suspension unit between the respective rear and front axle suspensions and the chassis of the vehicle.

Each of the fluid suspension units 12, 13, 15 and 16 are filled with a fluid under pressure, preferably air, whereby to allow movement of the axles relative to the chassis and provide for resilient suspension of the chassis on the axles. Air suspension or air springs of this general type are known in the art and further description of them is therefore not believed necessary.

Since air is the preferable medium of suspension, the spring units will hereinafter be referred to as air spring units, but it will be recognized that combination units such as air and oil can also be used in place of the straight air spring as illustrated in the drawings.

Air under pressure is obtained from a pump 40 that is driven in any suitable manner, preferably by way of a belt from the engine of the vehicle. The pump 40 delivers air under pressure through the conduit 41 into the high pressure supply tank 42. The maximum pressure available in the high pressure supply tank is regulated through suitable controls in the pump 40 by way of the control line 43. Such pressure regulating controls for maintaining maximum pressure in the high pressure tank are well known and are therefore not further disclosed nor described.

High pressure air is delivered from the supply tank 42 through the conduit 44 and by way of the high pressure chamber 45 in the control valve 50 to the supply conduit 46 that is connected with the inlet valve of the levelizing control valves 51, 52, 53 and 54 of the respective air springs 15, 16, 12 and 13.

Each of the levelizing control valves 51, 52, 53 and 54 are adapted to provide air into the respective air springs or to exhaust air from the respective air springs through the exhaust line 47 whereby to maintain a predetermined clearance height between the unsprung mass or axles and the sprung mass or chassis of the vehicle.

From the levelizing control valves 51, 52, 53 and 54, line 47 connects with an exhaust chamber 55 in valve 50 and it in turn connects with another exhaust chamber 56 that has the conduit 57 extending therefrom whereby the exhaust air emitted from the air springs 12, 13, 15 and 16 by the respective levelizing control valves is delivered to the low pressure air tank 58. The low pressure air tank 58 is connected with the suction side of the air pump 40 by way of the conduit 59. The low pressure air tank 58 is provided to receive the exhaust air from the air springs so as to conserve air supply and to avoid continuous suction of atmospheric air into the air suspension system by the pump 40. Thus the air suspension system is a closed system and only needs to draw in air from the atmosphere in the event air is lost from the suspension system.

Since all of the levelizing control valves 51, 52, 53 and 54 are of identical construction only one of them is illustrated in Figures 2–7 inclusive and will be described herein.

Figure 2:
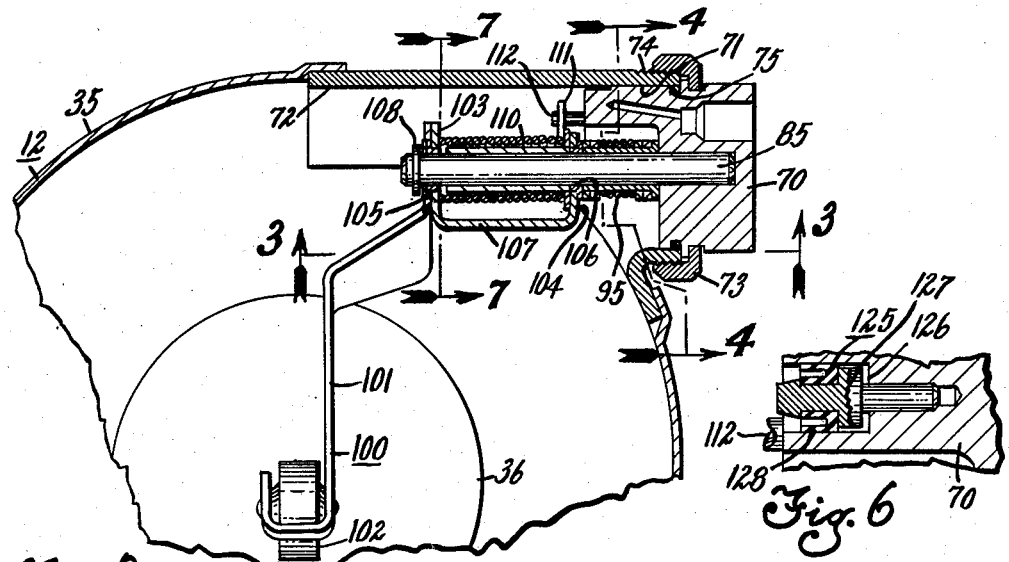
Figure 2 is a transverse cross sectional view of a valve mechanism for accomplishing the results of the invention.

Each of the levelizing control valves comprises a valve body 70, as shown in Figure 2, that is circular in transverse cross section and has the periphery 71 of a diameter just sufficient to fit within the internal diameter of the bore or sleeve 72 that extends from the container 35 of the air spring. The body 70 has a nut 73 thereon that has internal threads engaging the external threads 74 on the external periphery of the sleeve 72 whereby the body 70 is retained in the sleeve 72 and thereby positioned within the air spring 12. An O ring seal 75 is provided between the valve body 70 and the internal periphery of the sleeve 72 to prevent loss of air from within the air spring 12.

Figure 4:
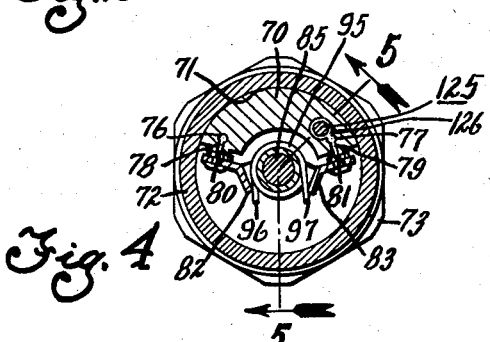
Figure 4 is a cross sectional view taken along line 4—4 of Figure 2.
Figure 5:
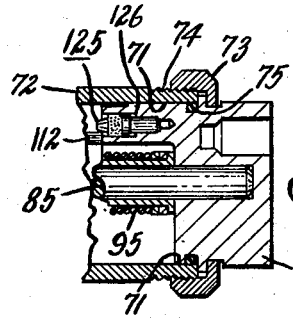
Figure 5 is a cross sectional view taken along line 5—5 of Figure 4.
Figure 3:
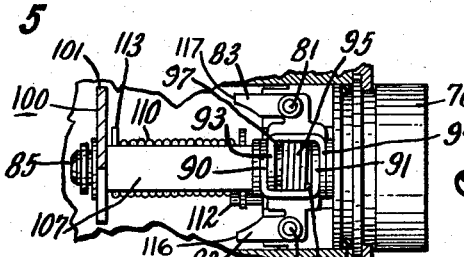
Figure 3 is a cross sectional view taken along line 3—3 of Figure 2.

The valve body 70 is provided with two passages 76 and 77 that extend parallel with the axis of the body 70, passage 76 providing a high pressure air inlet passage while passage 77 provides an exhaust passage for escape of air from within the air spring. Each of the passages 76 and 77 have passage portions 78 and 79 that are radial of the passages 76 and 77 and generally tangential to the axis of the body 70, as shown in Figure 4. These passages 78 and 79 are closed by the rubber valve members 80 and 81 that are carried on the valve devices 82 and 83 respectively.

Each of the valve devices 82 and 83 comprises a generally U shaped member that has ears extending upwardly therefrom to pivot the valve devices 82 and 83 on the shaft 85 that projects outwardly from the body 70, as more particularly shown in Figure 2. The valve device 82 has the ears 90 and 91 that provide support of the valve device 82 on the shaft 85. Similarly, the valve device 83 has the ears 93 and 94 that provide the support of the valve device 83 on the shaft 85. A torsion spring 95 is located around the shaft 85 and has its opposite ends 96 and 97 engaging the respective valve devices 82 and 83 whereby to hold the valve elements 80 and 81 against the ends of the passage 78 and 79 to close the inlet and exhaust passages against flow of air either into or out of the air spring 12.

Figure 8:
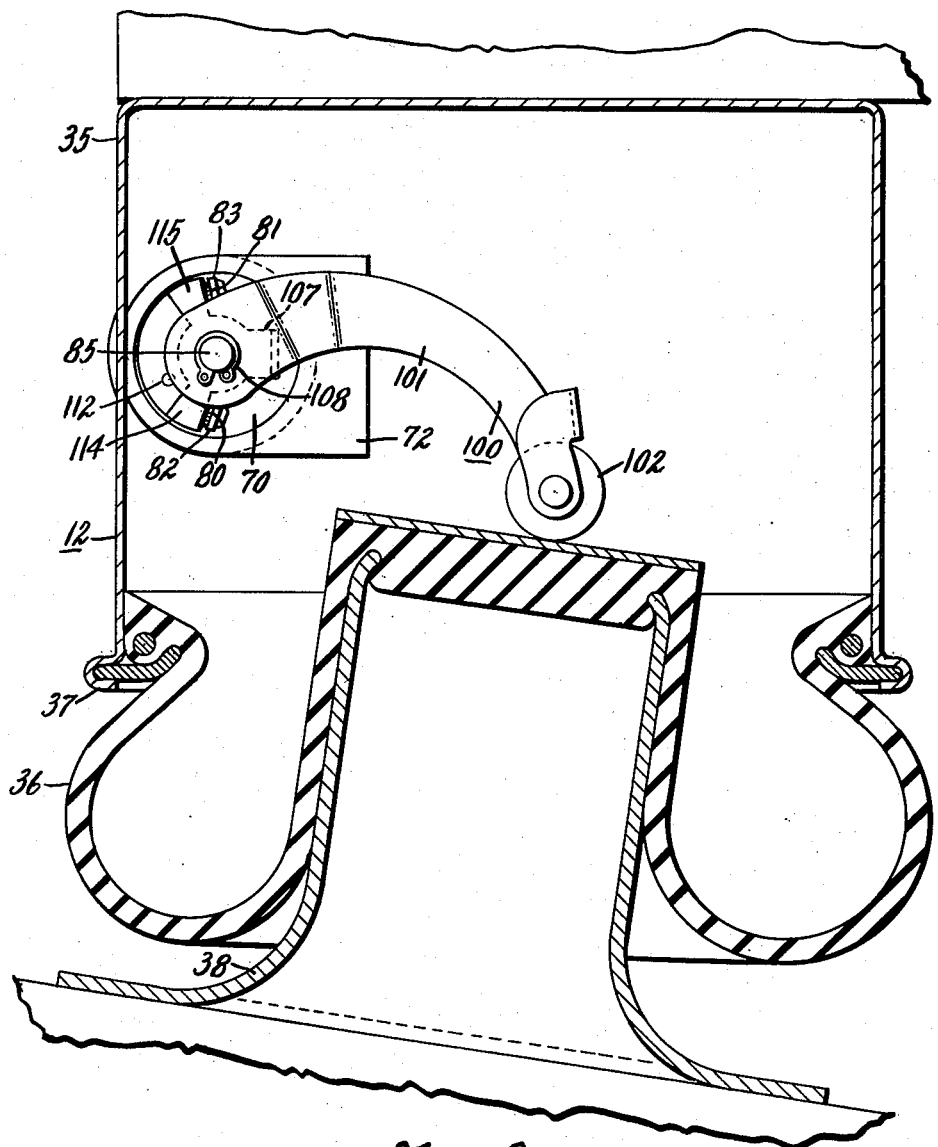
Figure 8 is a cross sectional diagrammatic representation of the control valve located within a fluid spring for accomplishing the feature of the invention.

An actuating member 100 is provided to operate the valve devices 82 and 83 to open them and thereby provide for inlet of air to the air spring or exhaust of air from the air spring under control of the actuating device 100 to maintain a predetermined clearance height between the sprung mass and the unsprung mass of the vehicle. As shown in Figures 1 and 8 the actuating device 100 engages the upper surface of the diaphragm or bellows 36 and therefore responds to any change in clearance height between the sprung mass and the unsprung mass of the vehicle. As the load in the vehicle increases tending to move the sprung mass downwardly toward the unsprung mass, the acutating device 100 will open the air inlet valve 82 and allow air to be supplied into the air spring and compensate for the increase in load and bring the clearance height between the sprung mass and the unsprung mass back to the predetermined normal position.

When the load decreases in the vehicle with the result that the diaphragm 36 or bellows tends to move upwardly of the air spring, the actuating device 100 will open the exhaust valve 83 and allow air to escape from the air spring and thereby allow the sprung mass to settle to the predetermined clearance height to which the device is regulated.

The actuating device 100 comprises an arm 101 carrying a nylon roller 102 on the end thereof that engages the upper surface of the diaphragm or bellows 36. The opposite end of the arm 101 is integral with a U-shaped bracket 107 that has the opposite ends 103 and 104 carried on the shaft 85 and thereby provides for pivotal rotation of the actuating device 100 on the shaft 85. The arm 101 and bracket 107 are retained on the shaft 85 by means of a C-washer 108 that fits in a groove in the end of the shaft 85. Bushings 105 and 106 support the ends 103 and 104 of the bracket 107 on the shaft 85 to reduce the friction of rotation of the actuator 100.

Figure 7:
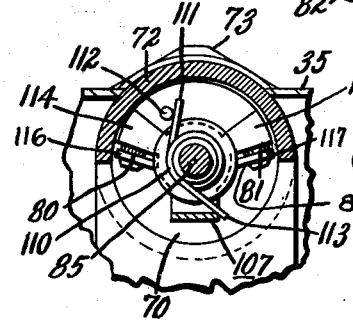
Figure 7 is a cross sectional view taken along line 7—7 of Figure 2.

A second torsion spring 110 is provided around the shaft 85 and has one end 111 thereof engaging a stop pin 112 on the valve body 70 and the opposite end 113 engaging the bracket 107 whereby the actuating device 100 is normally urged in one direction of rotation by the torsion spring 110 being clockise as viewed in Figure 7.

The ear 104 of the bracket 107 has radially extending ears 114 and 115. The ear 114 is adapted to engage the projecting portion 116 of the valve 82 whereas the ear 115 engages the projecting portion 117 of the valve 83 to actuate the respective valves upon rotation of the actuating device 100. When the actuating device 100 rotates in a counter-clockwise direction to rotate the bracket 107 in the same direction, as viewed in Figure 7, the ear 114 will open the valve 82 and allow air to be admitted into the air spring to offset an increase in load in the vehicle. On the other hand, when the actuating device 100 rotates in a clockwise direction about the shaft 85, as viewed in Figure 7, the ear 115 will engage the valve 83 and thereby open the exhaust port to allow air to escape from the air spring when the load decreases in the vehicle and thereby allow the sprung mass to return to the predetermined normal position relative to the unsprung mass. The ear 114 is adapted to engage the stop pin 112 when the valve device is either outside the air spring or when the diaphragm 36 moves downwardly to an abnormal extent, thereby limiting the degree of movement of opening of the exhaust valve 83 at any time.

The valve as hereinbefore described provides for normal levelizing or ride height control of the sprung mass relative to the unsprung mass of the vehicle so that irrespective of the load carried by the vehicle the sprung mass will be maintained at a relatively constant clearance height relative to the unsprung mass.

There are conditions under which however it is desirable to elevate the unsprung mass to an above normal clearance height relative to the unsprung mass, for example, when placing a vehicle on a filling station ramp that has been designed for older type vehicles having relatively high clearance between the ground and the chassis of the vehicle. The modern automobile has considerably less clearance height between the road and the sprung mass of the vehicle making it impossible under certain conditions to place a vehicle on lubrication racks of various garages that have been designed to take care of the older type vehicles having a high road clearance. Under these circumstances it is desirable to provide for a temporary increase in clearance height between the axle of the vehicle and the frame so as to allow the vehicle to be placed on the lubrication ramp.

The controls of this invention are therefore provided with auxiliary controls by which the normal predetermined clearance height between the sprung mass and the unsprung mass of the vehicle can be increased.

For this purpose the valve body 70 is provided with a unidirectional check valve 125 that is located in a chamber 126 adjacent the exhaust passage 77. The chamber 126 is connected with the exhaust passage 77 by way of the passage 79 that extends from the passage 77 into the chamber 126. Thus the pressure that exists in the exhaust passage 77 can also exist in the chamber 126.

The check valve 125 consists of a stem 127 that supports a double lipped valve member 128 that is of the character that when the pressure on the left hand side of the valve is higher than the pressure on the right hand side of the valve member 128 no flow of fluid is allowed through the valve member 128. However, when the pressure in the valve chamber 126 is higher than the pressure on the left hand side of the valve 128, flow of fluid can pass in a left hand direction from the chamber 126 into the interior of the air spring. This situation can occur only when fluid under pressure is admitted into the exhaust line 47 of the air suspension system illustrated in Figure 1. However, this situation cannot exist except under control of the valve 50 that is regulated or controlled by the operator of the vehicle by means of the Bowden cable 130.

The valve member 50 includes a valve spool 131 that has the lands 132 and 133 that form the exhaust chambers 55 and 56 heretofore described. A disk valve 135 is normally supported on the valve seat 136 by means of a spring 137 whereby the air inlet chamber 45 heretofore described is out of communication with the exhaust chambers 55 and 56. The exhaust chamber 55 communicates with the exhaust chamber 56 through a passage 138 in the valve spool 131.

The valve 50 is illustrated in Figure 1 as in the normal position to allow normal operation of the levelizing control valves 51, 52, 53 and 54 to maintain a predetermined clearance height between the sprung mass and the unsprung mass of the vehicle. Under this condition of the position of the valve 50, fluid under pressure is delivered from the high pressure tank 42 through the line 44 and 46 into the air springs 12, 13, 15 and 16 under control of the levelizing control valves 51, 52, 53 and 54. Exhaust of fluid from the air springs is delivered through the exhaust line 47 through the exhaust chamber 55 of the valve 50 and thence through the passage 138 of the spool 131 to the chamber 56 and thereby through the conduit 57 to the low pressure tank as permitted by the levelizing control valves in a manner hereinbefore described.

Under conditions wherein the operator of the vehicle desires to provide for an abnormal clearance height between the axle and the chassis of the vehicle, that is give the vehicle an above normal road clearance to provide for clearing of some road obstruction or permit placing the car on a ramp, the Bowden cable 130 is actuated manually by the operator of the vehicle to move the valve spool 131 of the valve 50 in a right hand direction whereby the end of the spool engages the valve disk 135 to close the passage 138. Simultaneously the valve 135 is lifted from its seat 136 whereby the high pressure chamber 45 communicates with the exhaust chamber 55. Since the passage 138 is closed, no high pressure fluid can escape to the low pressure tank through the line 57. Hence, the direct connection of the high pressure chamber 45 with the exhaust chamber 55 supplies the exhaust line 47 with high pressure fluid and it in turn supplies the check valve 125 with high pressure fluid so that at this time fluid under pressure can pass in a left hand direction around the outer periphery of the double lipped valve 128 into the air spring in exactly the same manner as though the inlet valve 82 of the control valve 70 was open. So long as the operator of the vehicle maintains the spool valve 131 in a right hand position as heretofore described, air under pressure will be supplied to the air springs 12, 13, 15 and 16 to elevate the chassis of the vehicle relative to the axles and thereby give an abnormal clearance height to the vehicle. The degree of increase of clearance height allowed the vehicle by the operation heretofore described is regulated by suitable limit stops between the axle and the frame of the vehicle, not shown.

Whenever the operator of the vehicle desires to return the vehicle to its predetermined clearance height and restore the normal operation of the levelizing and height control valves 51, 52, 53 and 54, the Bowden cable 130 is moved in a left hand direction to move the valve spool 131 correspondingly to return it to its position illustrated in Figure 1. When this occurs, since the vehicle is already riding at an abnormally high clearance height relative to the axle, the actuating member 100 of the levelizing and height control valves 51, 52, 53 and 54 will be in position to effect opening of the exhaust valve 83 of the control valves of the respective air springs. This will allow air to exhaust from the respective air springs until such time as the exhaust valves close which indicate that the vehicle is returned to its normal clearance height relative to the axle.

While the form of embodiment of the invention as herein disclosed constitutes a preferred form, it is to be understood that other forms might be adopted as may come within the scope of the claims which follow.

What is claimed is as follows.

1. In a fluid suspension system for controlling the clearance height between the unsprung mass and the sprung mass of a vehicle, a fluid spring positioned between an unsprung mass and a sprung mass of a vehicle, a fluid pressure source, a first control means responsive to changes in clearance height between the unsprung mass and the sprung mass controlling supply of fluid from said source to said spring and exhaust of fluid from said spring to maintain thereby a normal predetermined clearance height between the sprung mass and the unsprung mass, and a second control means under control of the operator of the vehicle effective to supply fluid from said source to said exhaust of said first control for supply of fluid pressure from said source to said spring through said exhaust and effect an above normal clearance height between the sprung mass and the unsprung mass.

2. In a fluid suspension system for controlling the clearance height between the unsprung mass and the sprung mass of a vehicle, a fluid spring positioned between an unsprung mass and a sprung mass of a vehicle, a fluid pressure source, a first control means responsive to changes in clearance height between the unsprung mass and the sprung mass controlling supply of fluid from said source to said spring and exhaust of fluid from said spring to maintain thereby a normal predetermined clearance height between the sprung mass and the unsprung mass, and a second control means having a high pressure inlet chamber connected with said source and a low pressure exhaust chamber, conduit means connecting said chambers with said first control means for supply of fluid under pressure to said first control means and through which exhaust fluid is received from said first control means, said second control means having valve means therein actuable under control of the operator of the vehicle to connect said inlet chamber with said exhaust chamber for supply of fluid under pressure from said source to said first control means through the exhaust conduit connected therewith.

3. In a fluid suspension system for controlling the clearance height between the unsprung mass and the unsprung mass of a vehicle, a fluid spring positioned between an unsprung mass and a sprung mass of a vehicle, a fluid pressure source, a first control means having independently actuable valve devices one of which functions as an inlet valve for connecting said source with said spring and the other of which functions as an exhaust valve to exhaust fluid from said spring and including actuating means engageable with said valve devices to open and close the same and responsive to changes in clearance height between the sprung mass and unsprung mass for inlet of fluid to the air spring or exhaust of fluid therefrom to maintain a normal predetermined clearance height between the sprung mass and the unsprung mass, said first control means including an additional valve means connecting said spring with exhaust but openable opposite to said exhaust valve to provide for supply of fluid from exhaust to said spring, and a second control means under control of the operator of the vehicle effective to supply fluid under pressure from said source through said additional valve means to said spring to effect an above normal clearance height between the sprung mass and the unsprung mass.

4. In a fluid suspension system for controlling the clearance height between the unsprung mass and the sprung mass of a vehicle, a fluid spring positioned between an unsprung mass and a sprung mass of a vehicle, a fluid pressure source, a first control means having independently actuable valve devices one of which functions as an inlet valve for connecting said source with said spring and the other of which functions as an exhaust valve to exhaust fluid from said spring and including actuating means engageable with said valve devices to open and close the same and responsive to changes in clearance height between the sprung mass and unsprung mass for inlet of fluid to the air spring or exhaust of fluid therefrom to maintain a normal predetermined clearance height between the sprung mass and the unsprung mass, said first control means including an additional valve means connecting said spring with exhaust but openable opposite to said exhaust valve to provide for supply of fluid from exhaust to said spring, and a second control means having a high pressure inlet chamber connected with said source and a low pressure exhaust chamber, conduit means connecting said inlet chamber of said second control with said inlet valve of said first control, conduit means connecting said low pressure exhaust chamber of said second control with said exhaust valve of said first control, said second control means having valve means therein actuable under control of the operator of the vehicle to connect said inlet chamber with said exhaust chamber thereof for supply of fluid under pressure from said source to said first control through the exhaust conduit connected therewith and thus through said additional valve means to said spring to effect an above normal clearance height between the sprung mass and the unsprung mass.

References Cited in the file of this patent

UNITED STATES PATENTS

| | | |
|---|---|---|
| 1,555,199 | Gouirand | Sept. 29, 1925 |
| 2,762,633 | Gouirand | Sept. 11, 1956 |